E. T. LIGON.
SUBMARINE PLOW.

No. 69,000. Patented Sept. 17, 1867.

Witnesses:
Theo Tusche
J. A. Service

Inventor:
E T Ligon
Per Munn & Co atty

United States Patent Office.

EDWIN T. LIGON, OF DEMOPOLIS, ALABAMA.

Letters Patent No. 69,000, dated September 17, 1867.

---

IMPROVED SUBMARINE PLOUGH.

*The Schedule referred to in these Letters Patent and making part of the same.*

---

TO ALL WHOM IT MAY CONCERN:

Be it known that I, EDWIN T. LIGON, of Demopolis, in the county of Marengo, and State of Alabama, have invented a new and useful Improvement in Submarine Plough; and I do hereby declare that the following is a full, clear, and exact description thereof, which will enable others skilled in the art to make and use the same, reference being had to the accompanying drawings, forming part of this specification.

This invention consists in attaching to the side of a steamboat or other vessel a submarine plough, which by its action on the bottom of rivers and other waters displaces the sand, mud, and other loose material, and thereby excavates a channel and deepens the water for purposes of navigation or for other purposes; the machine being so constructed that while the sand or mud is loosened by the plough a strong under-current is produced by a discharge of water from a powerful force-pump through a hose, as will be hereinafter described.

Figure 1:
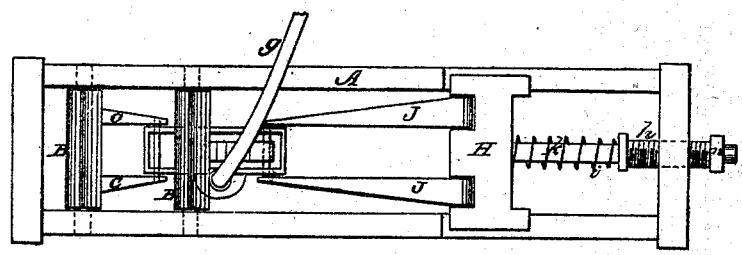

Figure 1 represents a top view of the plough, and

Figure 2:
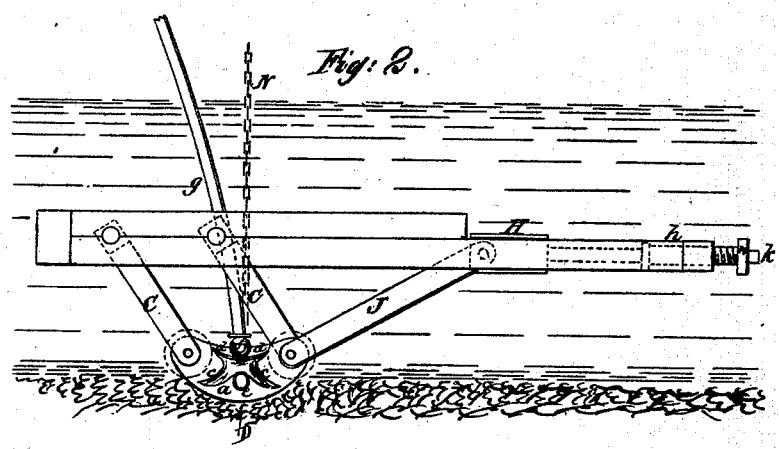

Figure 2 a side view.

Similar letters of reference indicate like parts.

A represents a frame, which is rectangular in form, to which the parts of the machine are attached. B B are two cross-pieces which are attached to the side pieces of the frame by pivots which allow them to turn or roll. The pivots or tenons on which they turn are seen in dotted lines in the drawing. C C represent arms which are attached to the pieces B B, as seen in fig. 2. D represents the plough proper. This is of peculiar form, it being in its cross-section a circular trough with one of the sides extending down, which side is marked $a$. Upon $a$ are placed wings, $c\ c$, which project laterally, somewhat like the mould-board of a common plough. Above these wings $c$ there projects another circular wing, $d$, through the middle of which there is an aperture which opens between the wings $c\ c$, as seen at $e$. To this aperture is connected a short piece of metallic pipe, marked $f$, and to the pipe is attached a flexible hose, marked $g$, which hose is connected with a force-pump. H is a cross-head which slides on the sides of the frame A. J J are arms which are attached to the cross-head and to the plough D, as seen in the drawing. $k$ is a rod which is attached to the cross-head at its inner end, and which passes through the frame, with a screw-nut, $n$, on its end. $h$ is a sleeve which passes through the frame, with a screw-thread, between which sleeve and the cross-head there is a spiral spring, $i$, the tension of which is governed by the sleeve as it is screwed through the frame. The plough is suspended by the chain N from the boat. As it is raised from the position seen in fig. 2, the cross-head will slide on its ways, and the rod $k$ will be projected through the sleeve, so that by adjusting the nut $n$ to the end of the sleeve, the plough is prevented from descending should the chain N fail to hold it to its place. In passing over obstacles on the bottom of the stream the plough would rise, but the tension of the spring would force it down again if the weight of it did not. When moving upon the bottom, as represented in fig. 2, with a powerful stream of water forced through the hose $g$, (producing thereby a strong artificial under-current,) and discharged into the loosened sand or mud, the sand, mud, or other loosened material would be projected off at right angles with the direction of the plough, so that the same would be carried off by the current of the river or by the tide, or be removed so far that the channel would be deepened in a much less expensive manner than it would be by dredging in the usual manner. The number of times which the operation would have to be repeated would depend upon the width and depth of the desired improvement.

What I claim as new, and desire to secure by Letters Patent, is—

A submarine plough, constructed and operating substantially as shown and described.

E. T. LIGON.

Witnesses:
THOS. J. FOSTER,
W. F. GLOVER.